US008112462B2

(12) United States Patent
Pradhan et al.

(10) Patent No.: US 8,112,462 B2
(45) Date of Patent: Feb. 7, 2012

(54) DISTRIBUTED GARBAGE COLLECTION IN A DATAFLOW SYSTEM

(75) Inventors: Mayank Pradhan, San Jose, CA (US); Edison Lao Ting, San Jose, CA (US); Robbert Van der Linden, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 135 days.

(21) Appl. No.: 12/622,596

(22) Filed: Nov. 20, 2009

(65) Prior Publication Data

US 2011/0125813 A1     May 26, 2011

(51) Int. Cl.
*G06F 17/30* (2006.01)
(52) U.S. Cl. ....................................................... 707/814
(58) Field of Classification Search .................. 707/609, 707/705, 802, 813, 814
See application file for complete search history.

(56) References Cited

U.S. PATENT DOCUMENTS

| | | | |
|---|---|---|---|
| 5,991,779 A * | 11/1999 | Bejar | 1/1 |
| 6,415,302 B1 | 7/2002 | Garthwaite et al. | |
| 6,490,599 B2 * | 12/2002 | Kolodner et al. | 1/1 |
| 7,058,670 B2 | 6/2006 | Garthwaite | |
| 2009/0030959 A1 | 1/2009 | Beard | |

FOREIGN PATENT DOCUMENTS

EP     0874309 A2 * 10/1998

OTHER PUBLICATIONS

Doani et al, Thread-Local heaps for Java, 2002 ACM, pp. 76-87.*
Lang et al, Garbage Collecting World, 1992 ACM, pp. 39-50.*
Jose M. Piquer, Indirect reference counting: A distributed garbage collection algorithm, 2006 SpringerLink, pp. 150-165.*
Benjamin Zorn, The Measured Cost of Conservative Garbage Collection, 1993 Practice & Experience, pp. 733-756.*
Abdulalahi et al, Garbage Collecting the Internet: A Survey of Distributed Garbage Collection, 1998 ACM, pp. 330-373.*
Tamar Domani et al., "Thread-Local Heaps for Java", ACM SIGPLAN Notices, vol. 38, Issue 2, Feb. 2003, pp. 76-87, ACM.

* cited by examiner

*Primary Examiner* — Fred I Ehichioya
(74) *Attorney, Agent, or Firm* — Prentiss Johnson; SVL; IP Law

(57) ABSTRACT

A method and system for distributed garbage collection in a pipelined workflow environment comprising a plurality of processing nodes that pass item references to each other. Each node maintains a reference list of local item references and a reference dictionary of remote item references, and periodically synchronizes the reference list with the reference dictionaries of other nodes in the workflow, so that item references are not marked for garbage collection while other processing nodes may still have outstanding references to them.

21 Claims, 13 Drawing Sheets

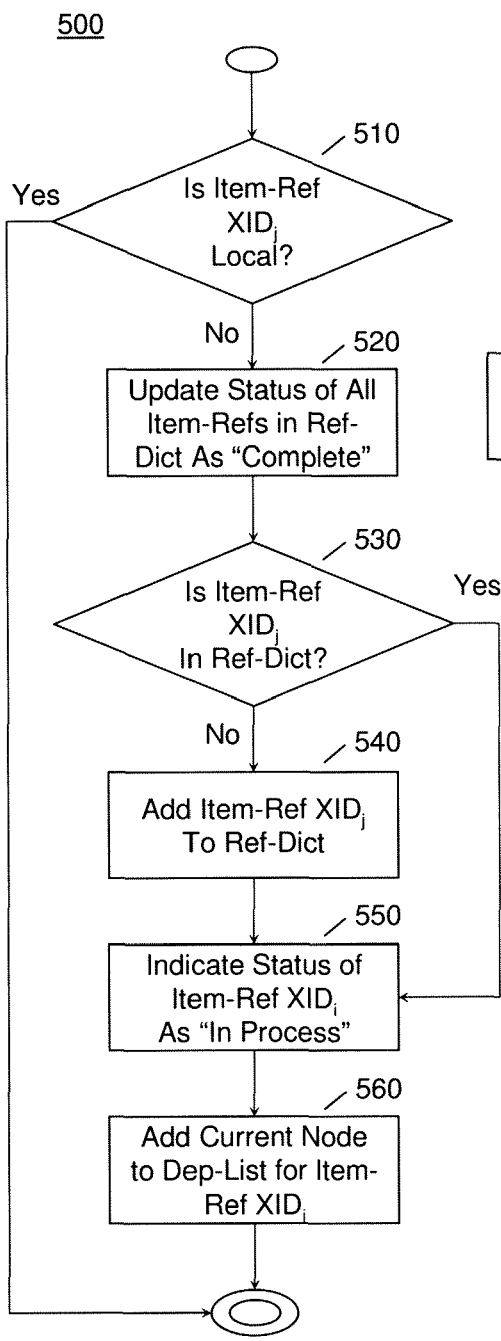
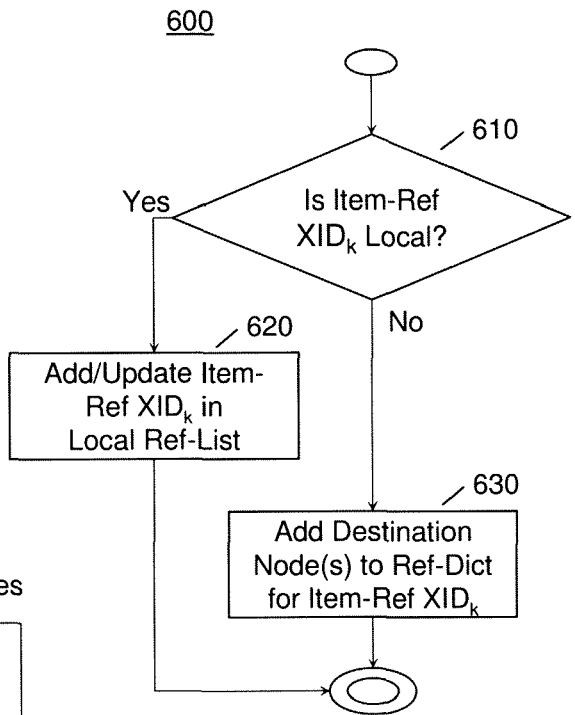
FIG. 7                                    FIG. 8

DISTRIBUTED GARBAGE COLLECTION IN A DATAFLOW SYSTEM

BACKGROUND

1. Technical Field

The present invention relates generally to garbage collection, and more particularly to systems and methods for distributed garbage collection in a dataflow system.

2. Discussion of Related Art

Proper resource management is an important aspect to efficient and effective use of computers. In general, resource management involves allocating resources (e.g., memory) in response to requests as well as deallocating resources at appropriate times, for example, when the requesters no longer require the resources. In general, the resources contain data referenced by computational entities (e.g., applications, programs, applets, etc.) executing in the computers. In practice, when applications executing on computers seek to refer to resources, the computers must first allocate or designate resources so that the applications can properly refer to them. When the applications no longer refer to a resource, the computers can deallocate or reclaim the resource for reuse. In computers each resource has a unique "handle" or item reference by which the resource can be referenced. The handle may be implemented in various ways, such as an address, array index, unique value, pointer, etc.

Resource management is relatively simple for a single computer because the events indicating when resources can be reclaimed, such as when applications no longer refer to them or after a power failure, are easy to determine. Resource management for distributed systems connecting multiple computers is more difficult because applications in several different computers may be using the same resource. Disconnects in distributed systems can lead to the improper and premature reclamation of resources or to the failure to reclaim resources. For example, multiple applications operating on different computers in a distributed system may refer to resources located on other machines. If connections between the computers on which resources are located and the applications referring to those resources are interrupted, then the computers may reclaim the resources prematurely. Alternatively, the computers may maintain the resources in perpetuity, despite the extended period of time that applications failed to access the resources, thus creating "memory leaks."

These difficulties have led to the development of systems to manage network resources, one of which is known as "distributed garbage collection." Garbage collection (or recycling) uses the notion that resources can be freed for future use when they are no longer referenced by any part of an application. Distributed garbage collection extends this notion to the realm of distributed computing, reclaiming resources when no application on any computer refers to them.

BRIEF SUMMARY

Accordingly, embodiments of the present invention include a method of distributed garbage collection in a workflow system, comprising creating a first item reference having a first item reference identifier at a first processing node having a first processing node identifier, sending the first item reference to one or more destination processing nodes, where each destination processing node has its own processing node identifier, in response to creating and sending the first item reference, adding an entry to a reference list on the first processing node, where the entry comprises the first item reference identifier and a local set of identifiers comprising the processing node identifier for each destination processing node to which the first item reference was sent, receiving a remote reference dictionary at the first processing node, where the remote reference dictionary comprises an entry comprising the first item reference identifier and a remote set of identifiers comprising one or more processing node identifiers, where each processing node identifier in the set represents a processing node that received the first item reference, applying the remote reference dictionary to the reference list, by subtracting the remote set of identifiers from the local set of identifiers to yield a first calculated set of one or more processing node identifiers, subtracting the local set of identifiers from the remote set of identifiers to yield a second calculated set of one or more processing node identifiers, and replacing the local set of identifiers with the union of the first and second calculated sets, determining if the local set of identifiers comprises any processing node identifiers, and if not, marking the first item reference for garbage collection, and performing garbage collection on the marked item reference.

Other embodiments of the present invention include a computer program product comprising a computer useable medium having a computer readable program, where the computer readable program when executed on a computer causes the computer to create a first item reference having a first item reference identifier at a first processing node having a first processing node identifier, send the first item reference to one or more destination processing nodes, where each destination processing node has its own processing node identifier, in response to creating and sending the first item reference, add an entry to a reference list on the first processing node, where the entry comprises the first item reference identifier and a local set of identifiers comprising the processing node identifier for each destination processing node to which the first item reference was sent, receive a second item reference having a second item reference identifier at the first processing node, send the second item reference to one or more destination processing nodes, where each destination processing node has its own processing node identifier, in response to receiving and sending the second item reference, add an entry to a local reference dictionary on the first processing node, where the entry comprises the second item reference identifier, a set of identifiers comprising the first processing node identifier and the processing node identifier for each destination processing node to which the second item reference was sent, and a status indicator that indicates the status of the second item reference as in process, receive a remote reference dictionary at the first processing node, where the remote reference dictionary comprises an entry comprising the first item reference identifier and a remote set of identifiers comprising one or more processing node identifiers, where each processing node identifier in the set represents a processing node that received the first item reference, apply the remote reference dictionary to the reference list, by causing the computer to subtract the remote set of identifiers from the local set of identifiers to yield a first calculated set of one or more processing node identifiers, subtract the local set of identifiers from the remote set of identifiers to yield a second calculated set of one or more processing node identifiers, and replace the local set of identifiers with the union of the first and second calculated sets, determine if the local set of identifiers comprises any processing node identifiers, and if not, mark the first item reference for garbage collection, and perform garbage collection on the marked item reference.

Still other embodiments of the present invention include a system for distributed garbage collection, comprising a memory having a reference list stored therein, where the reference list comprises a plurality of entries, each entry corresponding to a locally-originated item reference and comprising an identifier for the locally-originated item reference and a local set of destination node identifiers comprising a processing node identifier for each destination processing node to which the locally-originated item reference was sent, and a processor configured with logic to receive a remote reference dictionary, where the remote reference dictionary comprises a plurality of entries, each entry corresponding to an item reference and comprising an identifier for the item reference and a set of destination node identifiers, determine if the remote reference dictionary contains an entry for one or more locally-originated item references, and if yes, then for each locally-originated item reference, apply the remote reference dictionary entry to the reference list, by subtracting the set of destination node identifiers in the remote reference dictionary for the locally-originated item reference from the local set of identifiers for the same item reference to yield a first calculated set of one or more destination node identifiers, subtracting the local set of identifiers for the locally-originated item reference from the remote set of identifiers for the same item reference to yield a second calculated set of one or more destination node identifiers, and replacing the local set of identifiers with the union of the first and second calculated sets, determine if the local set of identifiers comprises any destination node identifiers for one or more locally-originated item references, and if not, mark those item references for garbage collection, and perform garbage collection on the marked item references.

The above and still further features and advantages of embodiments of the present invention will become apparent upon consideration of the following detailed description thereof, particularly when taken in conjunction with the accompanying drawings wherein like reference numerals in the various figures are utilized to designate like components.

BRIEF DESCRIPTION OF THE SEVERAL VIEWS OF THE DRAWINGS

FIG. 7 is a flowchart depicting an entry operation performed in a processing node of a distributed workflow management system according to an embodiment of the present invention.

FIG. 8 is a flowchart depicting an exit operation performed in a processing node of a distributed workflow management system according to an embodiment of the present invention.

DETAILED DESCRIPTION

Figure 1:
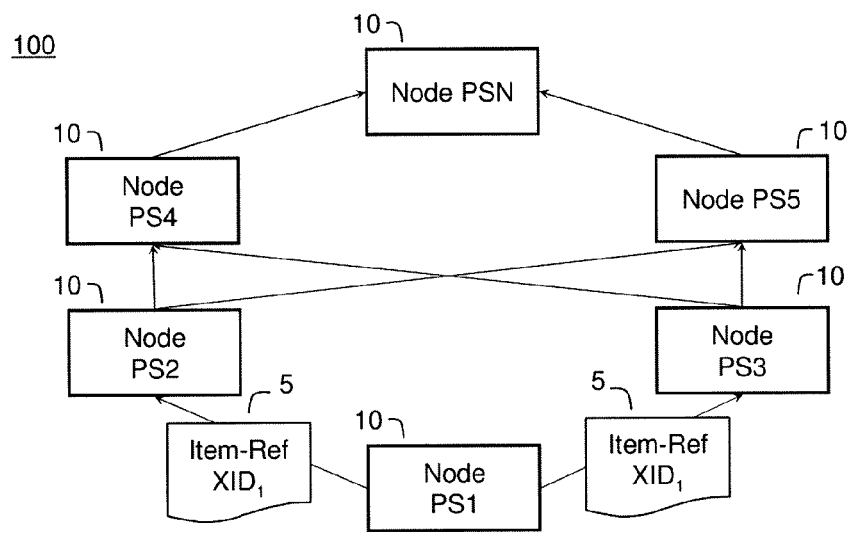
FIG. 1 is a block diagram illustrating an exemplary distributed workflow management system according to an embodiment of the present invention.
Figure 2:
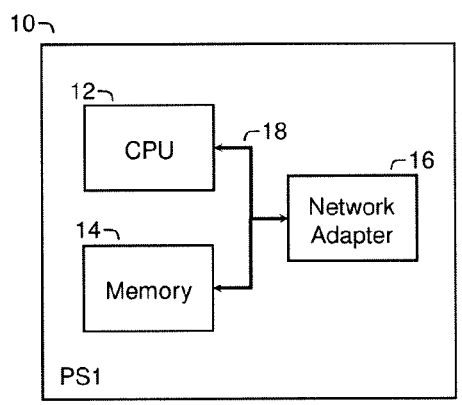
FIG. 2 is a block diagram illustrating an exemplary processing node of a distributed workflow management system according to an embodiment of the present invention.
Figure 3:
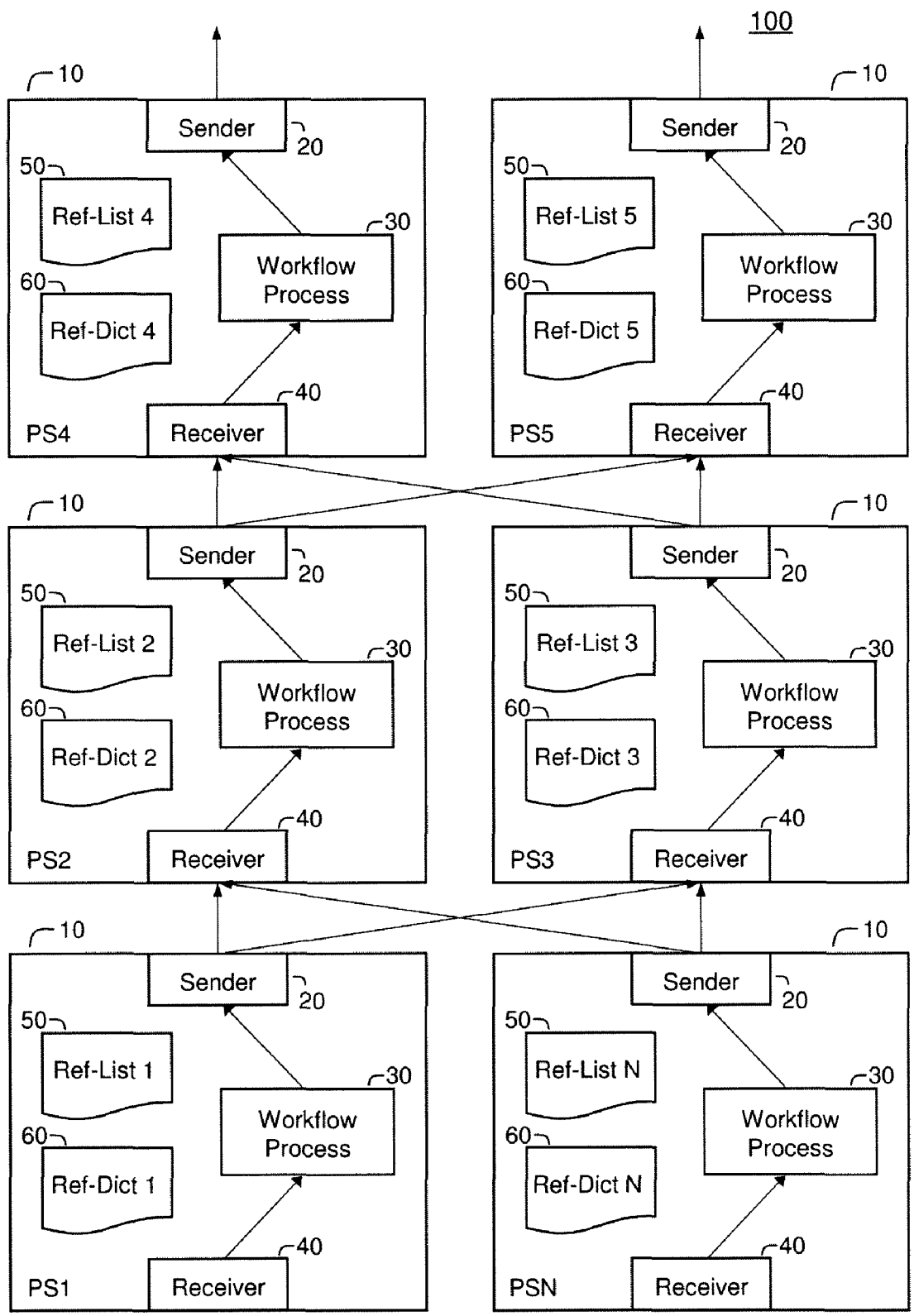
FIG. 3 is a block diagram illustrating an exemplary workflow process in an exemplary distributed workflow management system according to an embodiment of the present invention.

Referring now to the Figures, exemplary systems according to embodiments of the present invention are illustrated in FIGS. 1 through 3. An exemplary distributed workflow management system 100 is illustrated in FIG. 1. FIG. 1 shows a system 100 comprising multiple processing nodes 10, which are connected over networks to each other. The system 100 may include servers, clients, inputs, outputs, data sources, and other devices not shown, and individual components of the system may occur either singly or in multiples. Each node 10 may be local to one or more other nodes, may be local to one or more other nodes and remote from one or more other nodes, or may be remote from all of the other nodes. The nodes may communicate with each other by any suitable means, for example via a network.

The system 100 may be a distributed computing system, cloud space system, shared nothing database, or any other suitable system in which the distributed garbage collection system and methods may be used. In one embodiment, the system is a workflow system, for example a pipelined workflow system, in which a reference to an object is created in one processing subunit or node, and then sent to other processing nodes, where all of the nodes run independently of each other and share nothing between them. In another embodiment, the system is an IBM DB2 data partitioning feature environment, which has a shared nothing architecture and in which all SQL queries are broken down into parallel processing subunits or nodes. In still another embodiment, the system has a shared nothing architecture and all objects created are immutable; once created the objects can be sent to other nodes or copied any number of times, but the objects cannot be modified. While the present embodiments have particular advantages when used in a shared nothing environment, it is not required that the embodiments be used in a shared nothing environment.

The nodes 10 are able to pass an item reference 5 to one or more other nodes, in any desired fashion such as, for example, a step in a workflow. A workflow in this context may be one or more interrelated steps that are distinct and where the output of one step can be the input of another step. Each item reference 5 is assigned a unique identifier ("XID") that identifies this item reference in the system. The item reference 5 is a reference that will need to be garbage collected after it has been processed, for example in an IBM DB2 data partition feature environment, an item reference 5 may be a reference to an XML document that is spilled to temporary storage, which reference should be garbage collected after it is determined that the spilled XML document is not being used by the system any longer.

FIG. 2 is a block diagram illustrating an exemplary processing node 10, and is applicable to any or all of the processing nodes 10 used as a participant or communicatively coupled to a participant of a workflow as shown in FIG. 1. For example, processing node 10 can include a processor 12, memory 14, and a network adapter 16, all communicatively coupled together by system bus 18. Memory 14 may be implemented by any conventional or other memory or storage device (e.g., RAM, cache, flash, etc.), and may include any suitable storage capacity. The network adapter 16 may be implemented so that the node can communicate with one or more other nodes by any quantity of any suitable communications media (e.g., WAN, LAN, Internet, Intranet, wired, wireless, etc.), through a shared memory, or in any other suitable fashion. The computer systems of the present embodiments may include any conventional or other communications devices to communicate over networks or other communications channels via any conventional or other protocols, and may utilize any type of connection (e.g., wired, wireless, etc.) for access.

FIG. 3 is a diagrammatic representation of an exemplary workflow process in an exemplary distributed workflow management system 100 such as that of FIG. 1. Each processing node 10 in the system is assigned a unique identifier ("PSID") that identifies this node to others in the system. In this embodiment, the processing nodes work together as a workflow, e.g., a processing node generates an item reference that is then forwarded to other processing nodes for more work to be done upon it or its associated attributes. Those processing nodes perform the work and then forward the item reference to still other processing nodes until the termination of the workflow.

As shown in FIG. 3, each processing node 10 comprises at least three operations that can be performed on a particular item reference: a sender operation 20, one or more workflow process operations 30, and a receiver operation 40; and each node also stores at least two data structures: reference list 50 and reference dictionary 60. Referring now to FIGS. 2 and 3, it is understood that the components (e.g., processor 12, memory 14, and network adapter 16) of each processing node 10 operate in a suitable manner to implement the various operations performed by the node, and that the reference list 50 and reference dictionary 60 data structures are stored in the memory.

Each processing node 10, and its operative components, the sender and receiver operations 40 and the workflow process operations 30, may be implemented in the form of a processing system, or may be in the form of software. For example, each processing node may be a separate thread or process in a particular system, and each operative component of a node may be a function or method within that thread or process. The processing node 10 and its operative components may be implemented by any quantity of conventional or other computer systems or devices (e.g., computer terminals, personal computers (e.g., IBM-compatible, Apple MacIntosh, tablet, laptop, etc.), etc.), cellular telephones, personal data assistants (e.g., Palm Pre, Treo, iPhone, etc.), etc., and may include any commercially available operating system (e.g., AIX, Linux, OSX, Sun Solaris, Unix, Windows, etc.) and any commercially available or custom software (e.g., browser software, communications software, word processing software, etc.). These systems may include types of displays and input devices (e.g., keyboard, mouse, voice recognition, etc.) to enter and/or view information. If embodied in software, the processing node 10 or its operative components may be available on a recordable medium (e.g., magnetic, optical, floppy, DVD, CD, etc.) or in the form of a carrier wave or signal for downloading from a source via a communication medium (e.g., bulletin board, network, LAN, WAN, Intranet, Internet, etc.).

The operations of a processing node work serially from the entry point to the exit point of the node, and after having consumed the current tuple (e.g., one or more remote item references), can be considered to "move back" to the entry point to access the next tuple. The receiver operation 40 acts to receive item references from remote nodes, and may need to unpack the reference from transport format to a native format for processing. The workflow process operations 30 act upon the received item reference(s), and may also create new item reference(s). The sender operation 20 acts to send item references to one or more remote nodes, and may need to pack the reference into a transport format from its native format for transport. The sender may work in a broadcast mode, where the same item reference is sent to all processing nodes that are in communication with the processing node, or may work in a directed mode, where an item reference is sent to only particular processing nodes, for example depending on the value of a particular attribute of the item reference.

Depending on the environment in which the present embodiments are implemented, the sender and receiver operations 20, 40 may be a single operator or two separate operators, for example in an IBM DB2 data partition feature environment, these operations may be combined into the Table Queue operator, with the Table Queue Build acting as the sender, and the Table Queue Access acting as the receiver.

The reference list 50 and the reference dictionary 60 are used by the sender and receiver operations to track outstanding references in other processing nodes, so that the references are not garbage collected while other processing nodes may still have outstanding references to them. The reference list 50 keeps track of all item references produced by a particular processing node, and comprises an item reference identifier ("XID") and a list of relevant nodes ("DepList") to which that item reference was sent by the current node and thus may have an outstanding reference to a particular item reference.

The reference dictionary 60 keeps track of all remote references that have entered a particular processing node, and were either dropped (terminated) in the current node or were sent to other nodes. It comprises an item reference identifier ("XID"), a status identifier, and a list of relevant nodes ("DepList") that contains a set of identifiers for the processing nodes to which the item reference was sent by the current node, as well as the identifier for the current processing node. The status identifier has valid values "in process" and "complete", which indicate whether the processing node is still working on a particular item reference ("in process"), or whether the processing node has completed working on a particular item reference ("complete"), respectfully. The status identifier is useful to accommodate duplicating and eliminating operators. The reference dictionary handles duplicating operations such as joins in relational databases by maintaining at most a single entry for any one item reference, regardless of the number of copies that are made or sent by the node.

The reference list 50 and reference dictionary 60 are maintained and synchronized at customizable intervals (e.g., a pre-determined threshold) to ensure correctness of the garbage collection process, i.e., ensuring that an item reference is garbage collected only when all references to it have been completely processed. For each item reference that is sent to another processing node, two records are created for it, one on the sending node (before sending the item) and one on the receiving node (just after receiving the item). On the sending node it is recorded either in the reference dictionary or the reference list (depending on whether the reference is local or remote) while on the receiving node it is recorded in the reference dictionary of the receiving node.

The synchronization of the local reference list (which maintains references to locally produced objects whose references were sent to remote nodes) with one or more reference dictionaries (which maintain references to remote items that were received from remote nodes), logically operates as follows. The record of a reference in the local reference list indicating that an item was sent to a particular node opposes the record for the same reference in the reference dictionary received from that node, and the records cancel each other out when they are directly compared. In this manner, the records can be considered to annihilate each other wherever they meet, like matter and anti-matter. Meeting or direct comparison of the records occurs at one point in the system: in the reference list of the node where the item originated. Whichever record of the reference (the sending node's or the receiving node's record of the reference) gets into the reference list first acts as matter and whichever comes later annihilates its existence from the reference list. More specifically, when a reference list is synchronized with a remote reference dictionary, any new remote processing nodes are added to the reference list while any processing subunits that are common to both the reference list and the remote reference dictionary for the same item reference are removed. The reference dictionaries from the sending and receiving sides (i.e., from downstream and upstream nodes) may be synchronized with the reference list in any order; for example a receiving node may send its reference dictionary to be synchronized before a sending node. At any point, if there are no processing nodes in the DepList for a particular item reference in the reference list, then that item reference can be marked for garbage collection.

These embodiments are highly scalable because garbage collection is handled in a distributed fashion, and no central processing subunit is required to maintain references (and act as a bottleneck). The reference list and reference dictionary together operate based on "good enough" knowledge of the item references in the system, in comparison to most distributed garbage collection systems which require absolutely accurate knowledge of all references. Also, the embodiments operate in a "push" manner, in that each processing node may independently build and flush its reference dictionary and communicate with other nodes as needed, thus ensuring minimal impact to the performance and overall scalability of the system. This use of "push" instead of "pull", and the ability to effectively garbage collect based on "good enough" knowledge instead of absolute accuracy enhance the scalability of the embodiments.

While the embodiments are particularly useful for systems in which the volume of objects to be garbage collected is very high, for example a database system like DB2 that processes large number of rows such that each row has some kind of a reference, say a reference to an XML document that does not reside in permanent storage, which at some point needs to be garbage collected, they are not limited to such systems. The embodiments are also tolerant of operations in the processing nodes that may duplicate references and then send them to various other processing nodes where the reference is still considered as remote. An instance of such an operation is the join operator in relational database systems that duplicate the remote references based on the cardinality of the table it joins with and possibly sends the results to another processing node for join with one more table.

Figure 4:
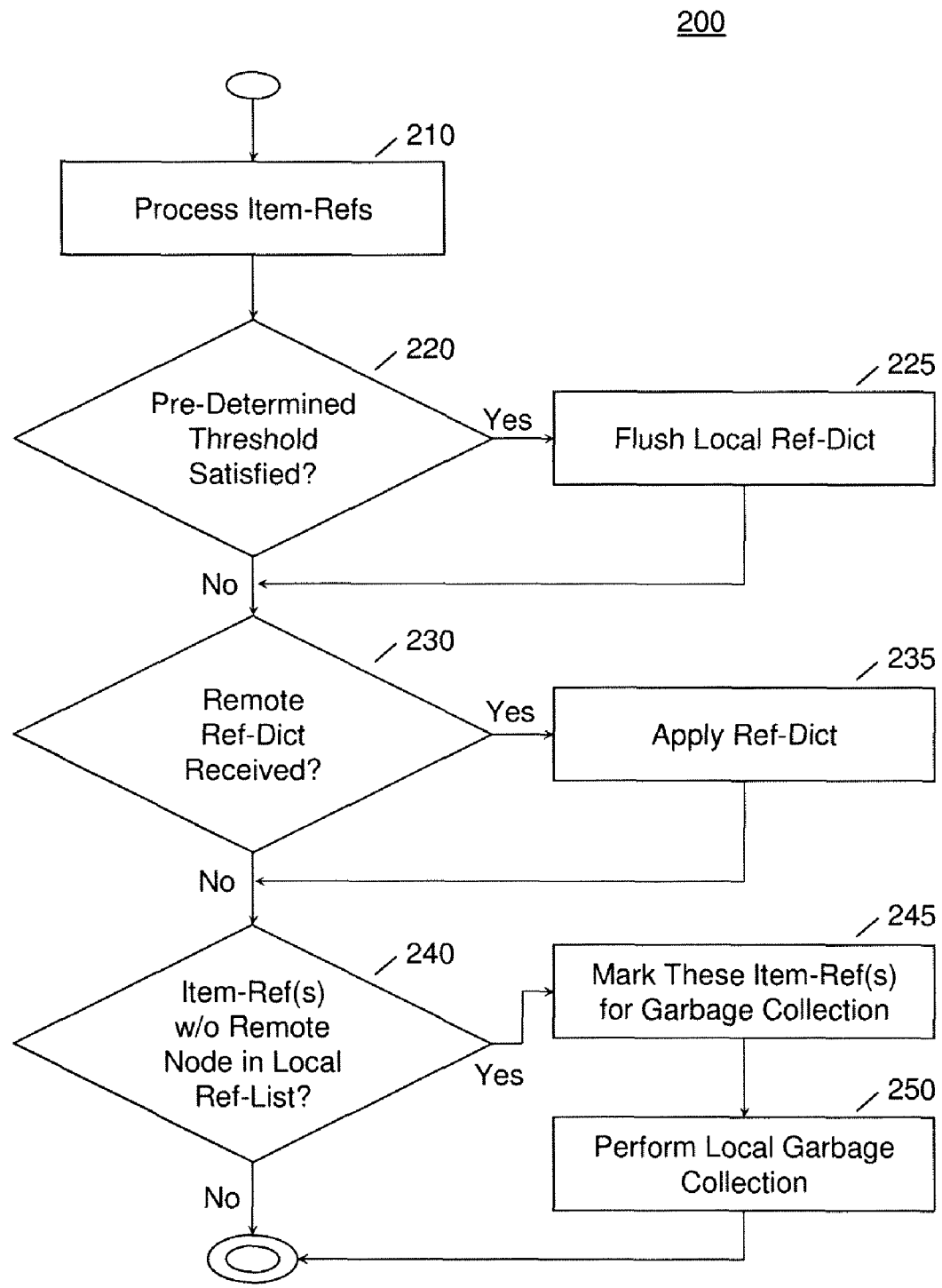
FIG. 4 is a flowchart depicting a process for performing garbage collection in a distributed workflow management system according to an embodiment of the present invention.

Turning now to FIG. 4, a process 200 for performing garbage collection in a distributed workflow management system is shown generally. This process 200 is described with reference to a processing node that processes item references (e.g., creates an item reference $XID_i$ or receives an item reference $XID_j$ from a remote node) that can be passed to other nodes, but it should be understood that the process is also applicable to other suitable processing nodes with suitable modification.

The processing node processes item references in step 210 (e.g., creates an item reference $XID_i$ and as part of this process updates a local reference list ("Ref-List"), as described below with reference to FIG. 5, or receives an item reference $XID_j$ from a remote node, and as part of this process, updates a local reference dictionary ("Ref-Dict"), as described below with reference to FIG. 6).

In step 220, the processing node determines whether a pre-determined threshold for flushing has been satisfied. The threshold is configurable to determine how frequently the processing nodes may communicate with each other to inform other nodes of the item references in their reference dictionaries. Thus, the threshold can be configured in a manner to control the amount of chatter between and among the processing nodes, e.g., a lower threshold results in more chatter, and a higher threshold results in less chatter (but increased heap usage). This ability to control chatter may be used to control overhead in systems (e.g., general purpose database management systems) that may include queries that barely need garbage collection (e.g., because all related resources are cleaned up at the end of the query) and queries that run against terabytes of data where it would be impossible to run the query without garbage collection. The threshold may be customized as desired, and can be, for example, a time interval, a reference dictionary size, a volume of data transfer, or any other suitable threshold for a garbage collection system, and may be set on a system-wide basis, node-by-node, or in any other suitable fashion. For example, in a particular embodiment, the threshold may be a pre-determined time interval that is determined for each node, either dynamically or statically, based on parameters such as the volume of data to be processed and the processing speed of each node.

If the determination in step 220 is yes, the processing node flushes the local reference dictionary in step 225 (an operation known as "flush-ref-dict") and sends the local reference dictionary to relevant remote processing nodes, as is further described below with reference to FIG. 10. A remote processing node is relevant if the local reference dictionary contains at least one reference from that node. If the threshold has not been satisfied, the processing node does not perform a flush at this time.

The processing node determines whether a remote reference dictionary has been received from another processing node in step 230. If yes, the processing node applies the reference dictionary to the local reference list in step 235, in an operation known as "Apply Ref-Dict", as is further described below with reference to FIG. 11. With respect to the reference list and reference dictionary, the "local" reference list or dictionary refers to the data structure stored in the present processing node, for example processing node PS1, as compared to a "remote" reference list or dictionary stored in a different node, for example processing node PS2. The operation acts to remove processing nodes from the DepList of the reference dictionary if those nodes have finished processing a particular item reference. After this operation, or if no such dictionary has been received, the processing node proceeds to step 240.

In step 240, the processing node determines whether the local reference list contains item references that do not refer to any remote nodes. If yes, the processing node marks these item references for garbage collection in step 245, and performs garbage collection in step 250. After garbage collection, or if no such item references exist, the processing node can end the process, or cycle back to the beginning of the process, as is desired for any particular implementation in a distributed workflow management system.

Figure 5:
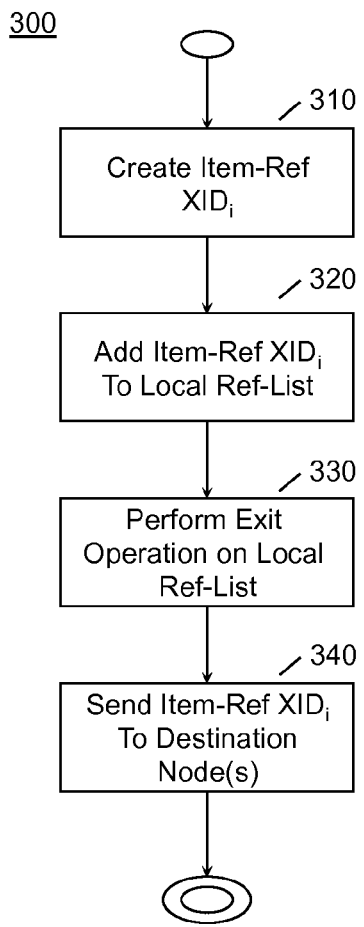
FIG. 5 is a flowchart depicting a process for creating an item reference in a processing node of a distributed workflow management system according to an embodiment of the present invention.

Turning now to FIG. 5, a process 300 for creating an item reference ($XID_i$) is illustrated, which is an example of processing an item reference from step 210 in the garbage collection process 200 of FIG. 4. In this process, the workflow process operation of the processing node creates an item reference ($XID_i$) in step 310, and in step 320 adds an entry corresponding to this item reference in the local reference list. In step 330, the processing node performs an exit operation to update the status of the created item reference ($XID_i$) in the local reference list, as is further described below with reference to FIG. 8, and in step 340, the processing node performs a sender operation on the created item reference ($XID_i$) to send it to one or more destination nodes in the distributed workflow management system. This process 300 may include a packing step in which the item reference is packed into a transport format, and the processing node may execute this packing step separately or in conjunction with either the exit or sending steps.

Figure 6:
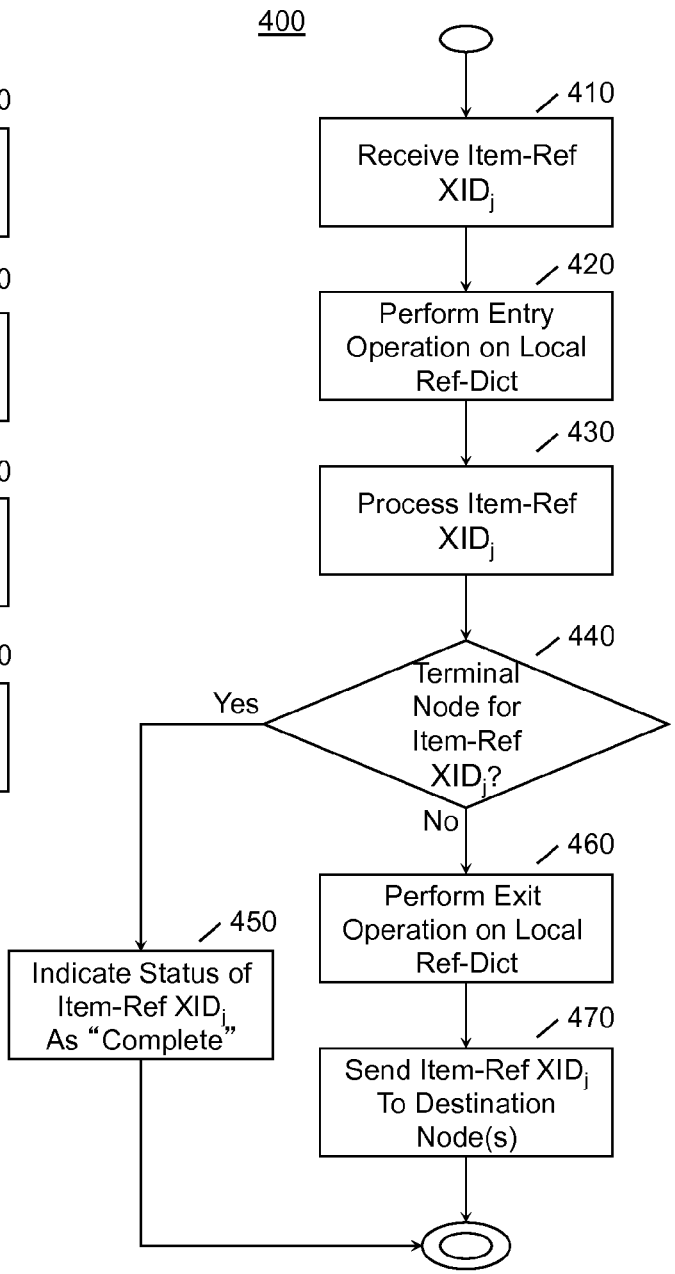
FIG. 6 is a flowchart depicting a process for receiving an item reference in a processing node of a distributed workflow management system according to an embodiment of the present invention.

FIG. 6 illustrates a process 400 for receiving an item reference ($XID_j$), which is an example of processing an item reference from step 210 in the garbage collection process 200 of FIG. 4. In this process, the receiving operation of the processing node receives item reference ($XID_j$) from another node in step 410, and in step 420 performs an entry operation in order to add an entry for the received item reference ($XID_j$) to the local reference dictionary, as is further described below with reference to FIG. 7. This process 400 may include an unpacking step in which the item reference is unpacked from a transport format, and the processing node may execute this unpacking step separately or in conjunction with either the receiving or entry steps. In step 430, the processing node performs one or more workflow process operations on the received item reference ($XID_j$).

The processing node then determines in step 440 whether it is the terminal node for the received item reference ($XID_j$), or whether it should pass the received item reference ($XID_j$) to one or more destination nodes. If it is the terminal node, then the processing node in step 450 updates the local reference dictionary to indicate that the status of the received item reference ($XID_j$) is "complete", which indicates that the processing node has finished processing this particular item reference. If it is not the terminal node, then the processing node in step 460 performs an exit operation to add the destination node(s) for the item reference ($XID_j$) to the local reference dictionary as is further described below with reference to FIG. 8, and in step 470, the processing node performs a sender operation on the received item reference ($XID_j$) to send it to one or more destination nodes in the distributed workflow management system. This process 400 may include a packing step in which the item reference is packed into a transport format, and the processing node may execute this packing step separately or in conjunction with either the exit or sending steps.

FIG. 7 illustrates a process 500 for performing an entry operation (XGBE), which is referred to as step 420 in the process for receiving an item reference of FIG. 6. In this process, the processing node determines in step 510 whether the received item reference ($XID_j$) is a local item reference, and if yes, this item reference is ignored and process 500 terminates. If the item reference is not local, then in step 520 the processing node updates the status of all item references that currently have entries in the local reference dictionary as "in process" to "complete" to indicate that the local processing node has finished processing these references. In step 530, the processing node determines if the received item reference ($XID_j$) has an entry in the local reference dictionary, and if not, the processing node adds an entry in step 540, or if the received item reference is a list of remote references (e.g., an XML Sequence defined in XQuery data model), then an entry is added for each item in the list. If yes, or after step 540, the processing node updates the entry or entries in the local reference dictionary to indicate that the status of the received item reference ($XID_j$) is "in process", meaning that the local processing node is currently acting on this item reference or references. In step 560, the processing node updates the entry or entries in the local reference dictionary to add the current node to the list of nodes for the received item reference ($XID_j$) or references. The entry process is then complete.

FIG. 8 illustrates a process 600 for performing an exit operation (XGBX), which is referred to as step 330 in the process of creating an item reference of FIG. 5, and as step 450 in the process for receiving an item reference of FIG. 6. Although this process is described as if item reference $XID_k$ is a single reference, it is not so limited, and if item reference $XID_k$ is a list of references, then this process 600 may be iterated through for each reference in the list. In this process, the processing node determines in step 610 whether the item reference $XID_k$ is a local item reference. If yes, the processing node in step 620 adds an entry or updates an existing entry for item reference $XID_k$ in the local reference list to indicate the destination node(s) for this item reference. If not local, the processing node in step 630 updates the entry for item reference $XID_k$ in the local reference dictionary to indicate the destination node(s) for this item reference. The exit process is then complete.

The process for creating and receiving item references, along with the operation of the entry and exit operations can be further understood by reference to FIGS. 9A through 9J, which are schematic diagrams illustrating the step-by-step transit of references into and out of various nodes in the exemplary distributed workflow management system of FIG. 3. Each of these Figures shows on its left-hand side a particular processing node, indicated by reference numeral 10 and labeled with a node number, e.g., "PS1" or "PS2", and on its right-hand side the contents of the reference list 50 (e.g., "Ref-List 1") and reference dictionary 60 (e.g., "Ref-Dict 1") for that particular processing node.

Figure 9A:
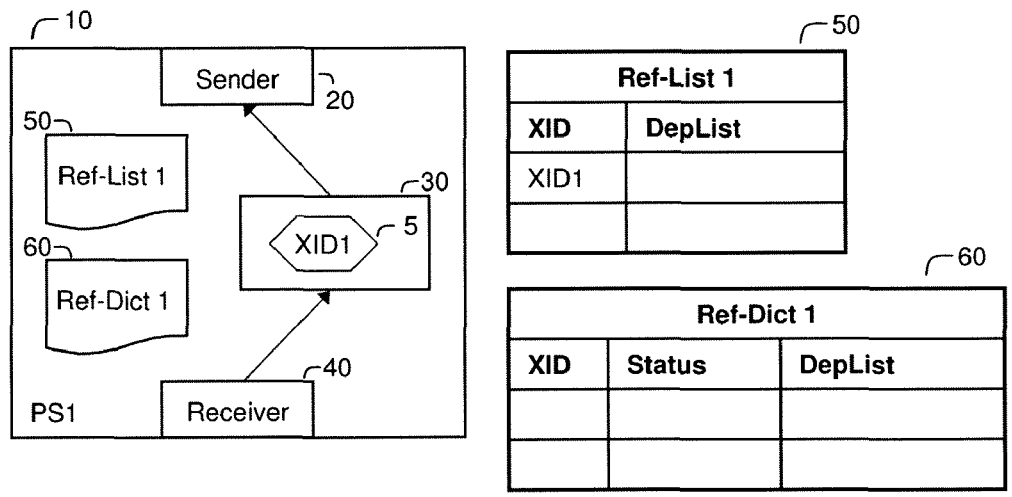
FIGS. 9A through 9J are schematic diagrams illustrating the processes for creating and receiving item references of FIGS. 5 and 6.
Figure 9B:
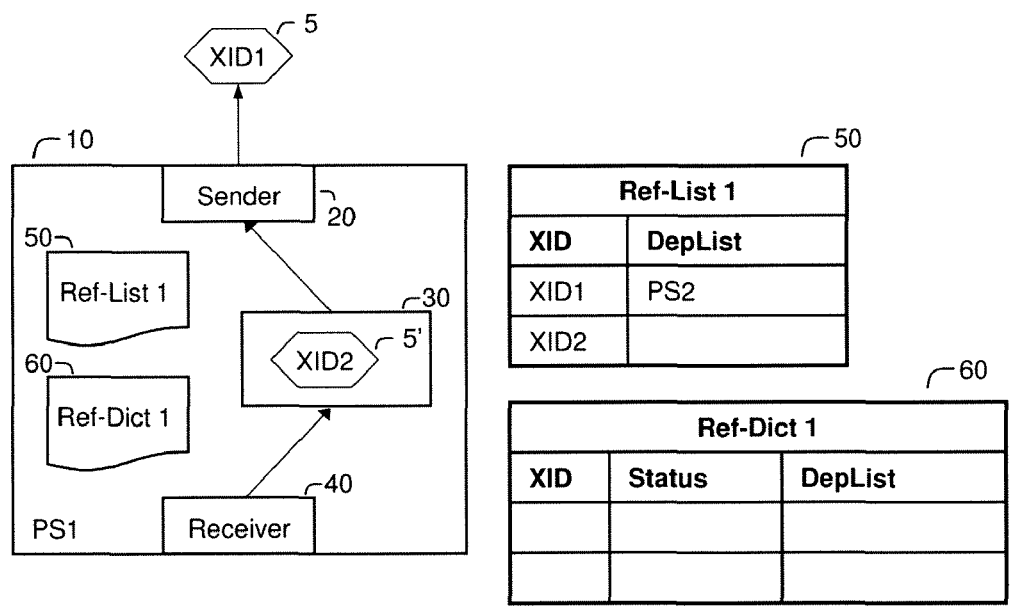

Referring now to FIG. 9A, the PS1 processing node 10 has created an item reference 5 having the unique identifier XID1, and has added an entry for XID1 to the local reference list 50. In FIG. 9B, the PS1 processing node 10 has sent item reference XID1 to destination node PS2, and sender operation 20 has thus added the unique identifier for node PS2 (the PSID, in this case "PS2") to the local reference list 50. The PS1 processing node 10 has also created a second item reference 5' having the unique identifier XID2, and has added an entry for XID2 to the local reference list 50.

Figure 9C:
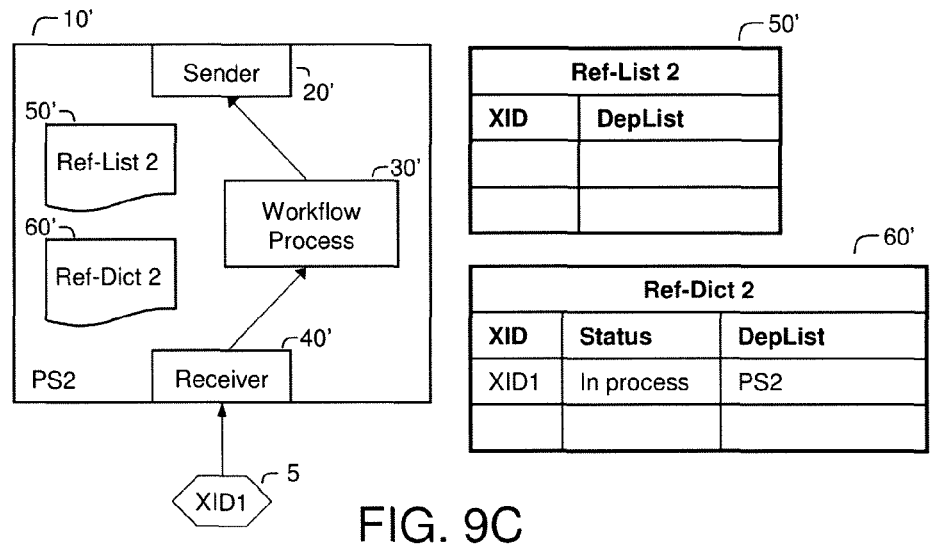
Figure 9D:
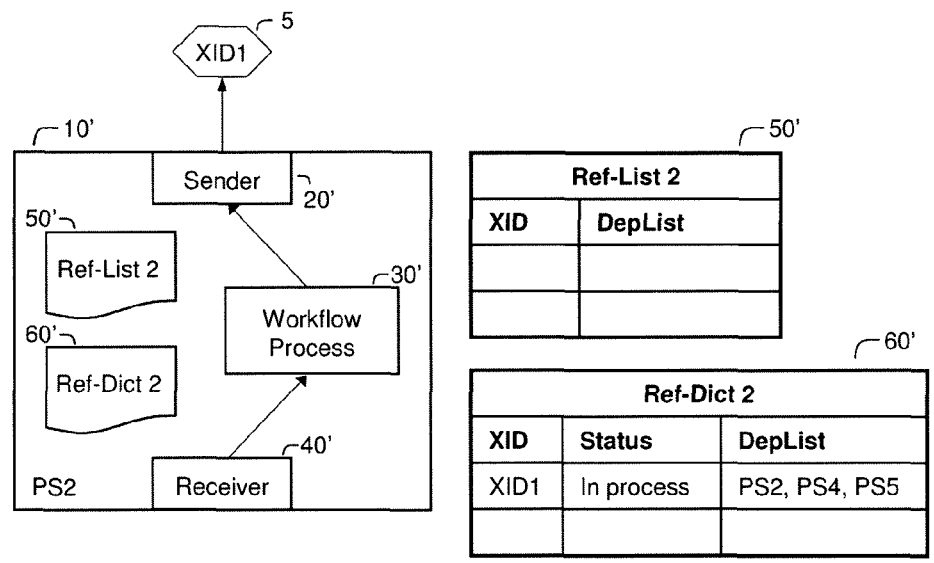

In FIG. 9C, the PS2 processing node 10' has received item reference 5 (XID1), and the receiver operation 40' has added an entry for XID1 to the local reference dictionary 60' indicating the current status as "in process" and the current node (PS2). In FIG. 9D, the PS2 processing node 10' sends item reference XID1 to destination nodes PS4 and PS5, and sender operation 20' has thus added the unique identifiers for these nodes (the PSIDs, in this case PS4 and PS5) to the local reference dictionary 60'.

Figure 9E:
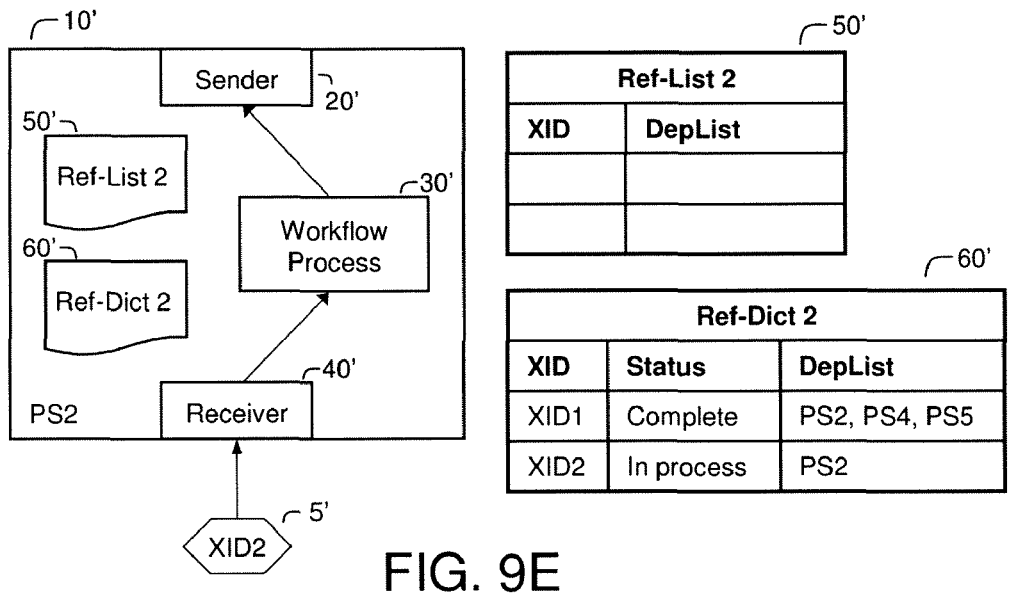
Figure 9F:
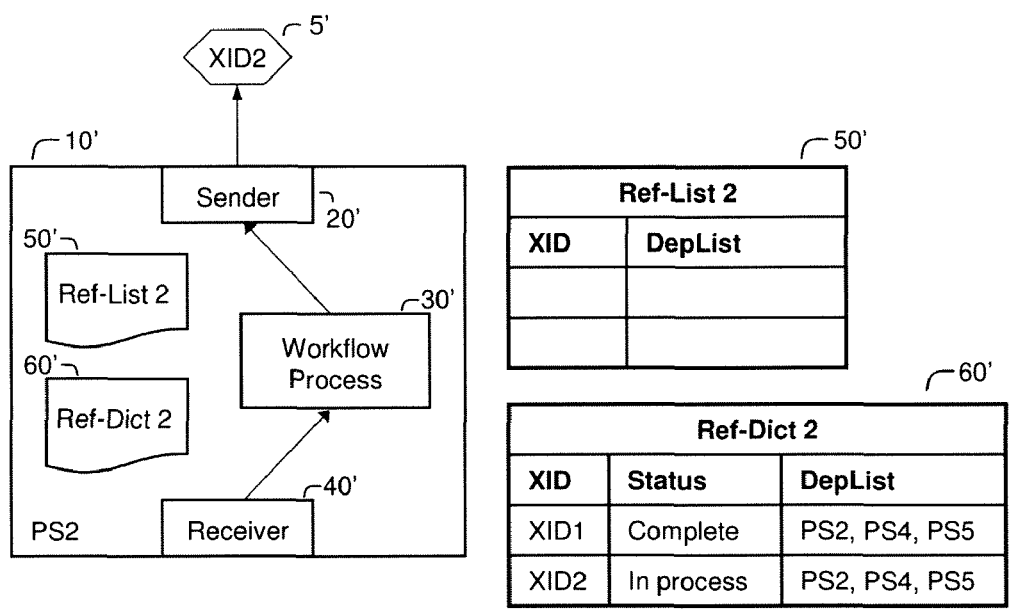

In FIG. 9E, the PS2 processing node 10' has received the second item reference 5' (XID2), and the receiver operation 40' has added an entry for XID2 to the local reference dictionary 60' indicating the current status as "in process" and the current node (PS2). The receiver operation 40' has also updated the status of the first item reference 5' (XID1) to "complete" in the local reference dictionary 60'. In FIG. 9F, the PS2 processing node 10' sends item reference XID2 to destination nodes PS4 and PS5, and sender operation 20' has thus added the unique identifiers for these nodes (the PSIDs, in this case PS4 and PS5) to the local reference dictionary 60'.

Figure 9G:
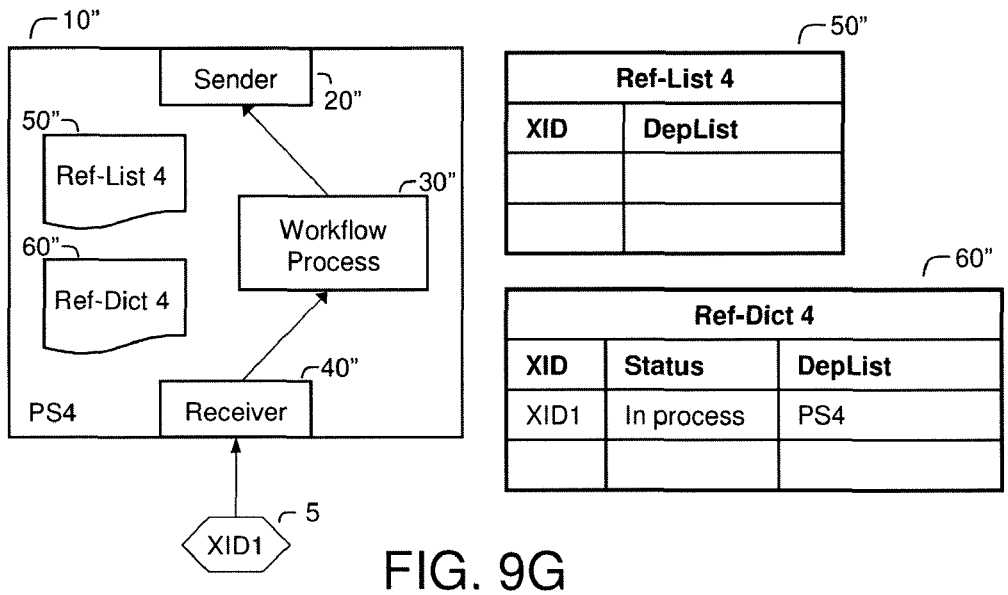
Figure 9H:
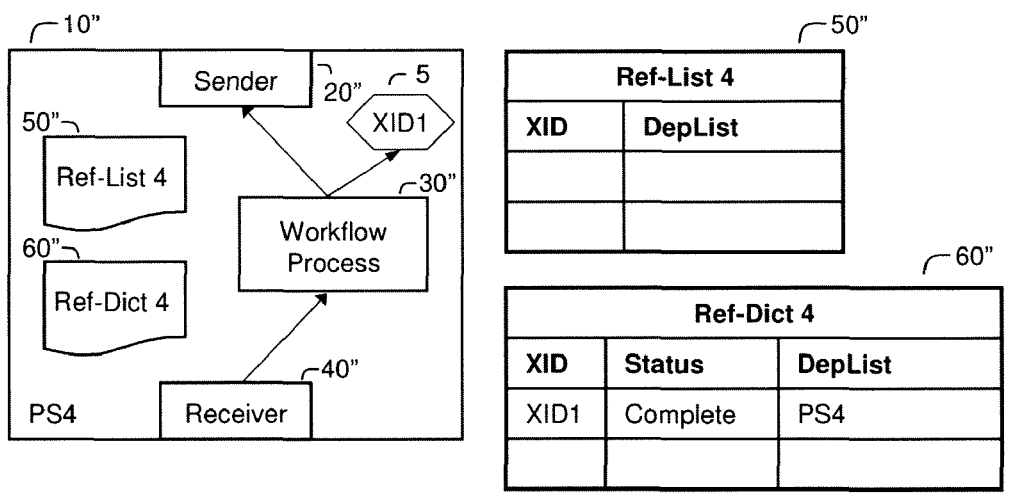

In FIG. 9G, the PS4 processing node 10" has received item reference 5 (XID1), and the receiver operation 40" has added an entry for XID1 to the local reference dictionary 60" indicating the current status as "in process" and the current node (PS4). PS4 is the terminal node for this particular item reference, and so in this case the item reference XID1 is not forwarded to another node. In FIG. 9H the processing node 10" updates the status of the item reference XID1 to "complete" in the local reference dictionary 60".

Figure 9I:
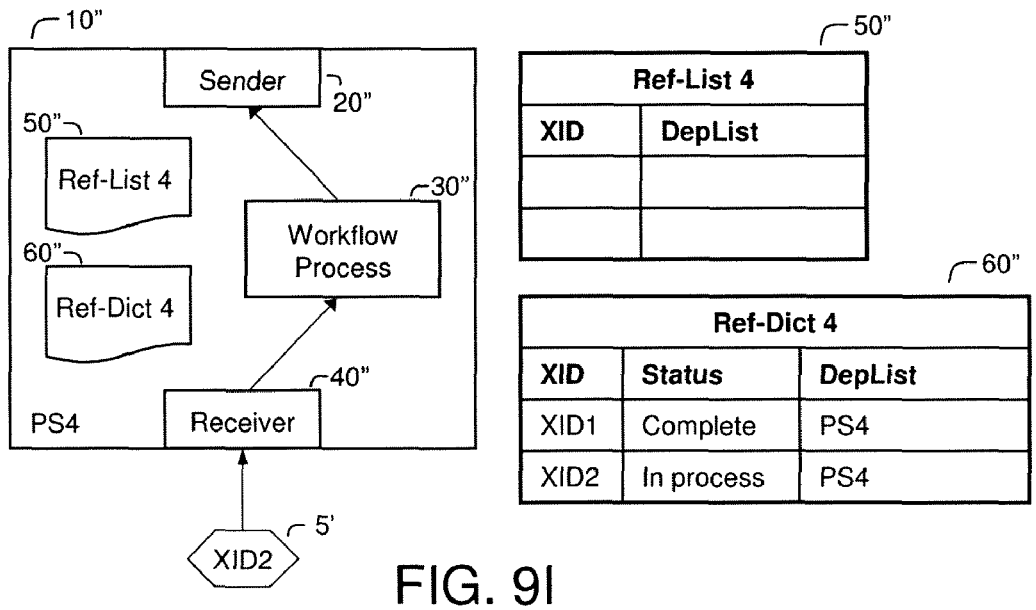
Figure 9J:
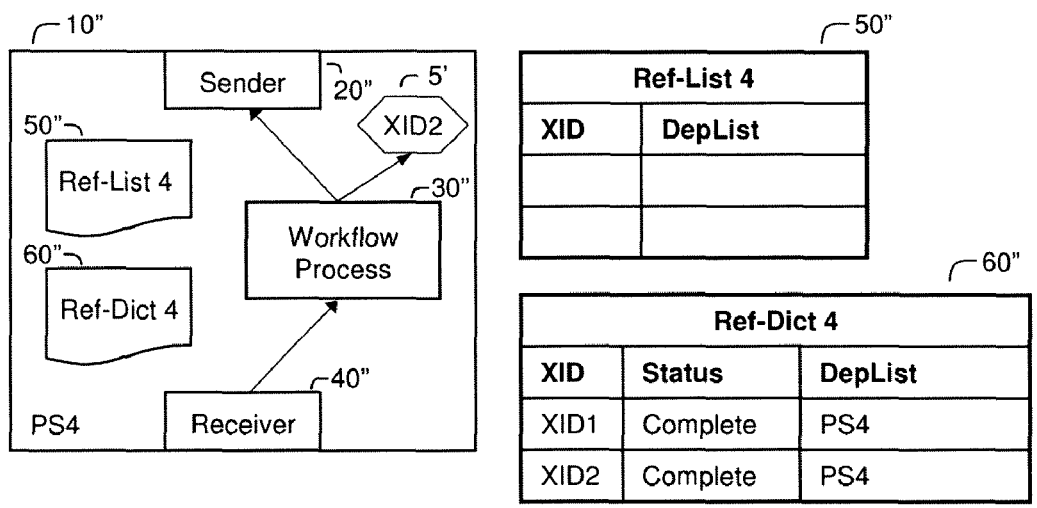

In FIG. 9I, the PS4 processing node 10" has received the second item reference 5' (XID2), and the receiver operation 40" has added an entry for XID2 to the local reference dictionary 60" indicating the current status as "in process" and the current node (PS4). PS4 is the terminal node for this particular item reference, and so in this case the item reference XID2 is not forwarded to another node. In FIG. 9J the processing node 10" updates the status of the second item reference XID2 to "complete" in the local reference dictionary 60". The PS5 processing node (not shown) also processes the two item references in a similar fashion to node PS4.

Figure 10:
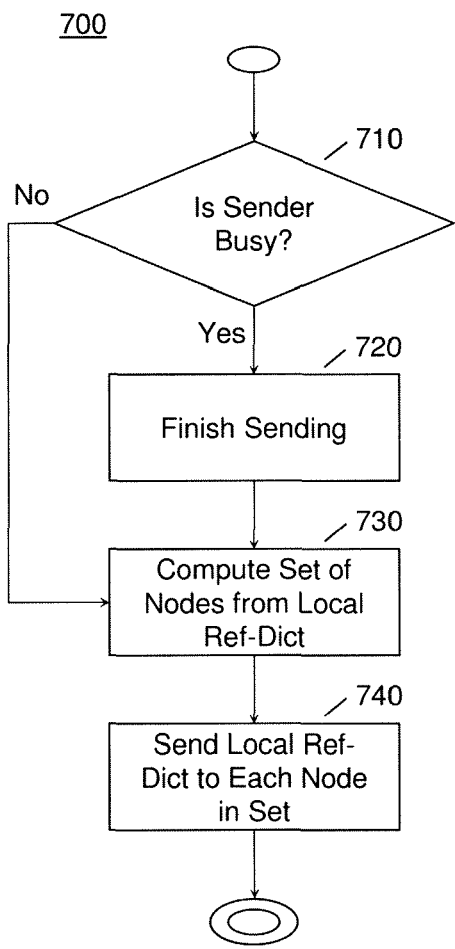
FIG. 10 is a flowchart depicting a process of flushing the local dictionary in a processing node of a distributed workflow management system according to an embodiment of the present invention.

FIG. 10 illustrates a process 700 for flushing the local reference dictionary, which is referred to as step 225 in the garbage collection process 200 of FIG. 4. In this process, the processing node determines in step 710 whether the sender operation is busy, and if yes, in step 720 directs the operation to finish its current task. When complete, or if the sender operation is not busy, the processing node in step 730 computes a set of node identifiers from the local reference dictionary. The set includes only those node identifiers from the DepList for which the corresponding item reference's status is "complete." Then, in step 740, the processing node sends its reference dictionary (or the relevant subset of its reference dictionary) to each node in the computed set.

Figure 11:
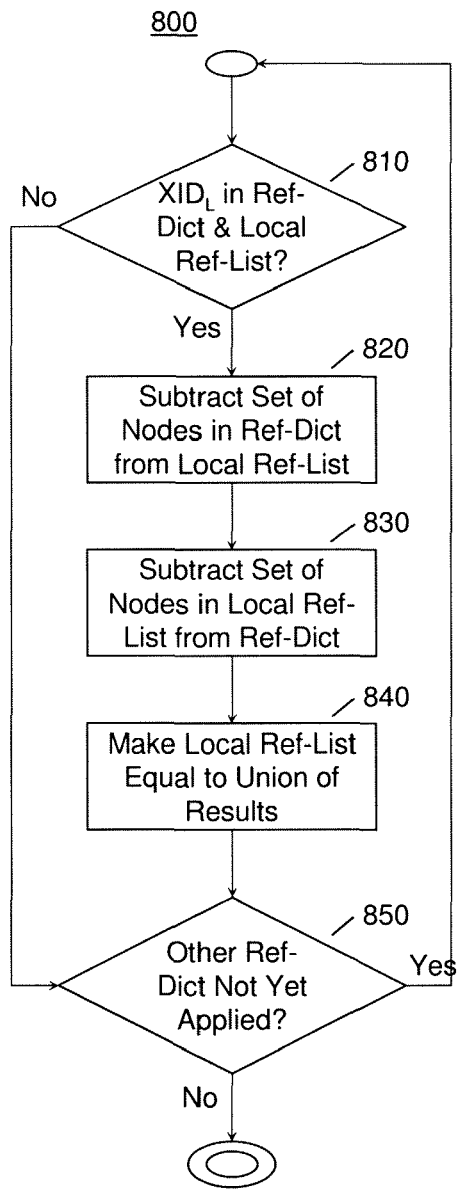
FIG. 11 is a flowchart depicting a process of applying a remote dictionary in a processing node of a distributed workflow management system according to an embodiment of the present invention.

FIG. 11 illustrates a process 800 for applying a reference dictionary to the local reference list, which is referred to as step 235 in the garbage collection process 200 of FIG. 4. In this process, the processing node in step 810 compares the received remote reference dictionary to the local reference list to determine whether the same item reference (e.g., $XID_L$) is present in both data structures. If not, the process proceeds to step 850. If yes, then the processing node in step 820 subtracts the set of node identifiers (the DepList) in the remote reference dictionary entry for $XID_L$ from the set of node identifiers (the DepList) in the local reference dictionary entry for $XID_L$, or in other words, performs the calculation (ref-list.DepList−ref.dict.DepList) to yield a first result set. In step 830, the processing node subtracts the set of node identifiers (the DepList) in the local reference list entry for $XID_L$ from the set of node identifiers (the DepList) in the remote reference dictionary entry for $XID_L$, or in other words, performs the calculation (ref-dict.DepList−ref-list.DepList) to yield a second result set. In step 840, the processing node determines the union of the first and second result sets, and makes the DepList of the local reference list equal to the union. In step 860, the processing node determines if there are any other reference dictionaries, such as other received remote reference dictionaries (from different nodes) or the local reference dictionary, which have not yet been applied to the local reference list. If yes, the process cycles back to step 810 and begins again with the new reference dictionary to be applied. If not, the process ends.

The process 800 for applying reference dictionaries can be further understood by reference to FIGS. 12A through 12D, which are schematic diagrams illustrating the step-by-step application of various reference dictionaries in the exemplary distributed workflow management system of FIG. 3. Each of these Figures shows on its left-hand side a particular processing node currently running this process, indicated by reference numeral 10 and labeled with a node number, e.g., "PS1", and on its right-hand side the contents of the local reference list 50 (e.g., "Ref-List 1") and the reference dictionary 60 (e.g., "Ref-Dict 1") being applied at that particular time.

Figure 12A:
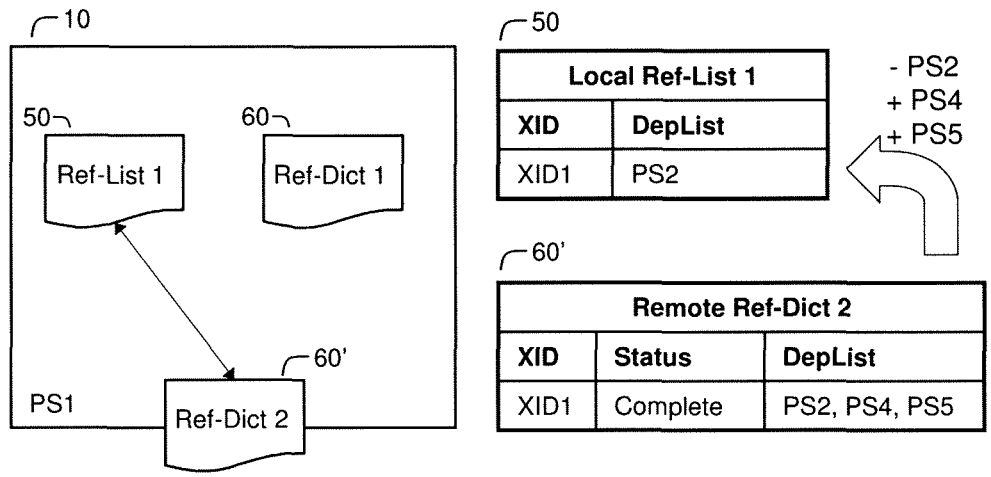
FIGS. 12A through 12D are schematic diagrams illustrating the process of applying the remote dictionary of FIG. 11.

Referring now to FIG. 12A, the PS1 processing node 10 has received a remote reference dictionary 60' ("Ref-Dict 2") from the PS2 processing node (not shown here). The PS1 node compares the remote reference dictionary 60' to the local reference list 50 ("Ref-List 1"), and determines that the same item reference (XID1) is present in both data structures. The PS1 node then compares the set of node identifiers (the DepList) in the remote reference dictionary entry for XID1 from the set of node identifiers (the DepList) in the local reference dictionary entry for XID1, and calculates the union of {Ref-List 1 DepList−Ref-Dict 2 DepList} and {Ref-Dict 2 DepList−Ref-List 1 DepList}. The PS1 node then replaces the set of node identifiers (the DepList) in the local reference dictionary with the calculated union. This can be visualized as:

apply-ref-dict(ref-dict2, ref-list1)
    i. ref-list1.DepList−ref-dict2.DepList=empty
    ii. RefDict2.DepList−RefList1.DepList=PS4, PS5
    iii. So ref-list1.DepList=PS4, PS5

Figure 12B:
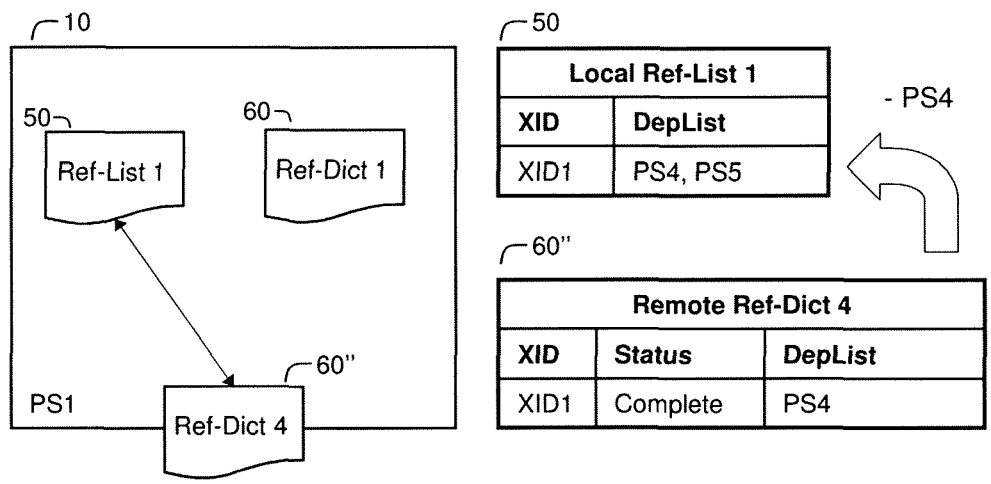

In FIG. 12B, the PS1 processing node 10 has received another remote reference dictionary 60" ("Ref-Dict 4") from the PS4 processing node (not shown here). The PS1 node compares the remote reference dictionary 60" to the local reference list 50 ("Ref-List 1"), and determines that the same item reference (XID1) is present in both data structures. The PS1 node then compares the set of node identifiers (the DepList) in the remote reference dictionary entry for XID1 from the set of node identifiers (the DepList) in the local reference dictionary entry for XID1, and calculates the union of {Ref-List 1 DepList−Ref-Dict 4 DepList} and {Ref-Dict 4 DepList−Ref-List 1 DepList}. The PS1 node then replaces the set of node identifiers (the DepList) in the local reference dictionary with the calculated union. This can be visualized as:

apply-ref-dict(ref-dict4, ref-list1)
    i. ref-list1.DepList−ref-dict4.DepList=PS5
    ii. RefDict4.DepList−RefList1.DepList=PS5
    iii. So ref-list1.DepList=PS5

Figure 12C:
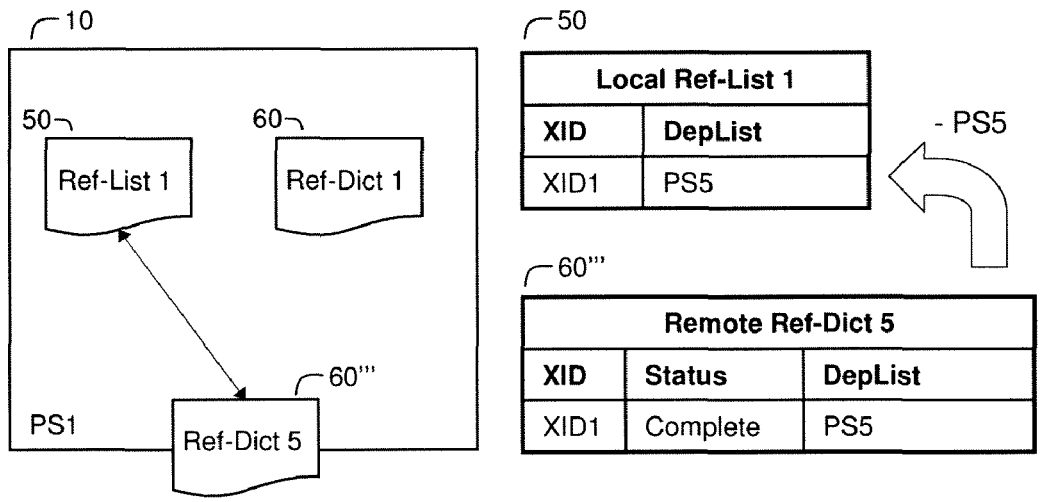
Figure 12D:
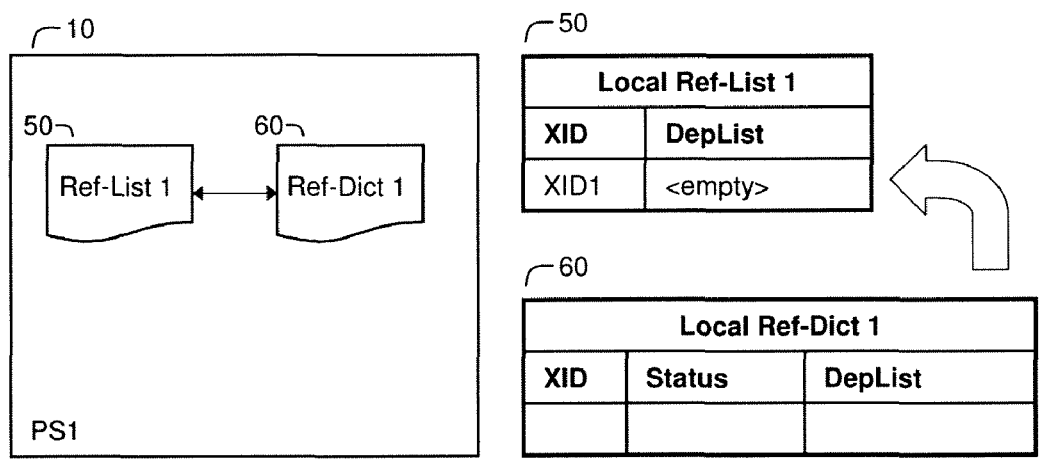

In FIG. 12C, the PS1 processing node 10 has received another remote reference dictionary 60''' ("Ref-Dict 5") from the PS5 processing node (not shown here). The PS1 node compares the remote reference dictionary 60''' to the local reference list 50 ("Ref-List 1"), and determines that the same item reference (XID1) is present in both data structures. The PS1 node then compares the set of node identifiers (the DepList) in the remote reference dictionary entry for XID1 from the set of node identifiers (the DepList) in the local reference dictionary entry for XID1, and calculates the union of {Ref-List 1 DepList−Ref-Dict 5 DepList} and {Ref-Dict 5 DepList−Ref-List 1 DepList}. The PS1 node then replaces the set of node identifiers (the DepList) in the local reference dictionary with the calculated union. This can be visualized as:

apply-ref-dict(ref-dict5, ref-list1)
 i. ref-list1.DepList−ref-dict5.DepList=empty
 ii. RefDict5.DepList−RefList1.DepList=empty
 iii. So ref-list1.DepList=empty In FIG. 12D, the PS1 processing node 10 compares the local reference dictionary 60 ("Ref-Dict 1") to the local reference list 50 ("Ref-List 1"), and determines that the item reference (XID1) is not in the local reference dictionary 60. Because the local reference list 50 now contains no nodes in the DepList for item reference XID1, the processing node 10 marks item reference XID1 ready for garbage collection.

To be effective, a garbage collection process should not clean up or collect an item if there are still outstanding references to it in the system. The described embodiments are effective, as shown by the following proof. Consider an object represented by its reference $X_i$. $X_i$ originates from processing subunit $PS_i$. At time t the reference list $RL_i$, on $PS_i$, contains the processing subunit $PS_j$ in its DepList against $X_i$—represented as $RL_i.X_i.DepList=\{PS_j\}$. At this stage $X_i$ can be garbage collected only when $RL_i.X_i.DepList$ is empty. An entry in the reference list can only be removed as a result of synchronization with a remote reference dictionary $RD_j$ (using the apply-ref-dict method) contained in the processing subunit $PS_j$. There can be any number of reference dictionaries in the entire system that contain $X_i$; $PS_j$ itself, $PS_{j-1}$, $PS_{j-2}$ and so on or $PS_{j+1}$, $PS_{j+2}$ and so on, where $PS_{j-1}$ is the processing subunit that sent $X_i$ to $PS_j$, $PS_{j-2}$ is the processing subunit that sent $X_i$ to $PS_{j-1}$. Similarly, $PS_{j+1}$ is the processing subunit that $PS_j$ sent $X_i$ to and $PS_{j+2}$ is a processing subunit that $PS_{j+1}$ sent $X_i$ to. (Note $PS_{j-1}$ or $PS_{j-2}$ or $PS_{j-n}$ could be $PS_i$ itself).

However, $X_i$-$PS_j$ pair can only be found in two processing subunits in the entire system, namely $PS_{j-1}$ and $PS_j$ itself. Processing subunit $PS_{j-1}$ adds $X_i$-$PS_j$ pair to its reference dictionary, $RD_{j-1}$, just before sending $X_i$ to $PS_j$, as part of XGBX operator. Similarly, $PS_j$ adds $X_i$-$PS_j$ pair to its reference dictionary, $RD_j$, as soon as $X_i$ is received on $PS_j$, as part of XGBE operator.

Because $PS_j$ is already in $RL_i.X_i.DepList$ either apply-ref-dict($RD_j$, $RL_i$) or apply-ref-dict($RD_{j-1}$, $RL_i$) must have already occurred (not considering the vacuous case where j−1=i in which case it must be that $PS_j$ is in $RL_i.X_i.DepList$ because of the XGBX operator in $PS_i$). Note that processing subunits $PS_j$ and $PS_{j-1}$ could be running as separate processes and their flushing threshold can be met independently of each other, causing either of them to be applied to $RL_i$ first. The method is agnostic to this order. If, the $PS_j$ entry in $RL_i$.$X_i$.DepList is due to apply-ref-dict($RD_{j-1}$, $RL_i$) then $PS_j$ entry in $RL_i.X_i.DepList$ is newly added and can be removed from the DepList only after apply-ref-dict($PS_j$, $RL_i$). As a side note it can safely be concluded at this point that $PS_{j-1}$ is not the terminal point for $X_i$, since $RD_{j-1}.Xi.DepList$ has nothing but $PS_{j-1}$. When apply-ref-dict($RD_j$, $RL_i$) is applied to $RL_i$, $PS_j$ will be removed from $RL_i.X_i.DepList$. However, $RL_i.X_i.DepList$ will become an empty set at this stage if and only if $RD_j$. $X_i.DepList=\{PS_j\}$; $PS_j$ did not send $X_i$ to another processing subunit. In other words, $PS_j$ was the terminal point for $X_i$. This means that there cannot be any other reference to $X_i$ in any of the processing subunits in the entire system. When $RL_i.X_i.DepList$ in fact becomes empty, $X_i$ can be garbage collected.

On the other hand, if $PS_j$ was not the terminal point, then XGBX on $PS_j$ will ensure that $RD_j$. $X_i.DepList=\{PS_j, PS_{j+1}\}$. When such a $RD_j$ is applied to $RL_i$ the result will be $RL_i.X_i.DepList=\{PS_{j+1}\}$ indicating that there are still some outstanding references to $X_i$ in the system, in particular in $PS_{j+1}$, and possibly any other processing subunits to which $PS_{j+1}$ would have sent $X_i$. In any case this indicates, that $X_i$ cannot be garbage collected at this time. It would follow that the proof show above can be recursively applied to $RL_i.X_i.DepList=\{PS_{j+1}\}$ treating $PS_{j+1}$ as $PS_j$. Because we did not assume any specifics for the reference $X_i$ the proof can be applied to any reference in the system, proving that any $X_i$ in the system will only be cleaned up by this algorithm after all references to $X_i$ have already been processed.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It is to be understood that the software for the computer systems of the present invention embodiments may be implemented in any desired computer language and could be developed by one of ordinary skill in the computer arts based on the functional descriptions contained in the specification and flow charts illustrated in the drawings. By way of example only, the software may be implemented in the C#, C++, Python, Java, or PHP programming languages. Further, any references herein of software performing various functions generally refer to computer systems or processors performing those functions under software control.

The computer systems of the present invention embodiments may alternatively be implemented by any type of hardware and/or other processing circuitry. The various functions of the computer systems may be distributed in any manner among any quantity of software modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operation steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A processing system suitable for storing and/or executing program code may be implemented by any conventional or other computer or processing systems preferably equipped with a display or monitor, a base (e.g., including the processor, memories and/or internal or external communications devices (e.g., modem, network cards, etc.) and optional input devices (e.g., a keyboard, mouse or other input device)). The system can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the system to become coupled to other processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, method and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometime be executed in the reverse order, depending on the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of distributed garbage collection in a workflow system, comprising:
   creating a first item reference having a first item reference identifier at a first processing node having a first processing node identifier;
   sending the first item reference to one or more destination processing nodes, wherein each destination processing node has its own processing node identifier;
   in response to creating and sending the first item reference, adding an entry to a reference list on the first processing node, wherein the entry comprises the first item reference identifier and a local set of identifiers comprising the processing node identifier for each destination processing node to which the first item reference was sent;
   receiving a remote reference dictionary at the first processing node, wherein the remote reference dictionary comprises an entry comprising the first item reference identifier and a remote set of identifiers comprising one or more processing node identifiers, wherein each processing node identifier in the set represents a processing node that received the first item reference;
   applying the remote reference dictionary to the reference list, by
      subtracting the remote set of identifiers from the local set of identifiers to yield a first calculated set of one or more processing node identifiers,
      subtracting the local set of identifiers from the remote set of identifiers to yield a second calculated set of one or more processing node identifiers, and
      replacing the local set of identifiers with the union of the first and second calculated sets; and
   determining if the local set of identifiers comprises any processing node identifiers, and if not, marking the first item reference for garbage collection;
   performing garbage collection on the marked item reference;
   receiving a second item reference having a second item reference identifier at the first processing node;
   sending the second item reference to one or more destination processing nodes, wherein each destination processing node has its own processing node identifier; and
   in response to receiving and sending the second item reference, adding an entry to a local reference dictionary on the first processing node, wherein the entry comprises the second item reference identifier, a set of identifiers comprising the first processing node identifier and the processing node identifier for each destination processing node to which the second item reference was sent, and a status indicator that indicates the status of the second item reference as in process.

2. The method of claim 1, further comprising:
   performing a pipelined workflow operation on the second item reference prior to said sending step.

3. The method of claim 1, further comprising:
   receiving a third item reference having a third item reference identifier at the first processing node;
   in response to receiving the third item reference, updating the local reference dictionary by changing the status indicator of any existing entries to indicate the status as complete;
   sending the third item reference to one or more destination processing nodes, wherein each destination processing node has its own processing node identifier; and
   in response to receiving and sending the third item reference, adding an entry to the local reference dictionary, wherein the entry comprises the third item reference identifier, a set of identifiers comprising the first processing node identifier and the processing node identifier for each destination processing node to which the third item reference was sent, and a status indicator that indicates the status of the third item reference as in process.

4. The method of claim 1, further comprising:
   receiving a third item reference having a third item reference identifier at the first processing node;
   in response to receiving the third item reference, updating the local reference dictionary by changing the status indicator of any existing entries to indicate the status as complete;
   determining that the third item reference terminates in the first processing node; and
   in response to said determining, adding an entry to the local reference dictionary, wherein the entry comprises the third item reference identifier, a set of identifiers comprising the first processing node identifier, and a status indicator that indicates the status of the third item reference as in process.

5. The method of claim 4, further comprising:
   determining if a pre-determined threshold has been satisfied, and if it has, flushing the local reference dictionary by:
   determining each entry in the local reference dictionary that comprises a status indicator of complete;
   computing a master set of identifiers comprising the union of each set of identifiers from each of the determined entries; and
   sending the local reference dictionary to each processing node having a processing node identifier in the master set.

6. The method of claim 5, further comprising:
   determining if there are one or more duplicate entries for each entry in the local reference dictionary, and if yes, removing the one or more duplicate entries.

7. The method of claim 5, wherein the pre-determined threshold is a pre-determined time interval.

8. The method according to claim 1, wherein at least one of the steps is implemented on a computer system.

9. A computer program product comprising a computer useable medium having a computer readable program, wherein the computer readable program when executed on a computer causes the computer to:
   create a first item reference having a first item reference identifier at a first processing node having a first processing node identifier;
   send the first item reference to one or more destination processing nodes, wherein each destination processing node has its own processing node identifier;
   in response to creating and sending the first item reference, add an entry to a reference list on the first processing node, wherein the entry comprises the first item reference identifier and a local set of identifiers comprising the processing node identifier for each destination processing node to which the first item reference was sent;
   receive a second item reference having a second item reference identifier at the first processing node;
   send the second item reference to one or more destination processing nodes, wherein each destination processing node has its own processing node identifier;
   in response to receiving and sending the second item reference, add an entry to a local reference dictionary on the first processing node, wherein the entry comprises the second item reference identifier, a set of identifiers comprising the first processing node identifier and the processing node identifier for each destination processing node to which the second item reference was sent, and a status indicator that indicates the status of the second item reference as in process;

receive a remote reference dictionary at the first processing node, wherein the remote reference dictionary comprises an entry comprising the first item reference identifier and a remote set of identifiers comprising one or more processing node identifiers, wherein each processing node identifier in the set represents a processing node that received the first item reference;

apply the remote reference dictionary to the reference list, by causing the computer to subtract the remote set of identifiers from the local set of identifiers to yield a first calculated set of one or more processing node identifiers, subtract the local set of identifiers from the remote set of identifiers to yield a second calculated set of one or more processing node identifiers, and replace the local set of identifiers with the union of the first and second calculated sets; and determine if the local set of identifiers comprises any processing node identifiers, and if not, marking the first item reference for garbage collection;

perform garbage collection on the marked item reference;

receive a third item reference having a third item reference identifier at the first processing node;

in response to receiving the third item reference, update the local reference dictionary by changing the status indicator of any existing entries to indicate the status as complete;

determine whether that the third item reference terminates in the first processing node or does not terminate in the first processing node; and in response to determining that the third item reference terminates in the first processing node, add an entry to the local reference dictionary, wherein the entry comprises the third item reference identifier, a set of identifiers comprising the first processing node identifier, and a status indicator that indicates the status of the third item reference as in process.

10. The computer program product of claim 9, wherein the computer readable program when executed on a computer further causes the computer to:

in response to determining that the third item reference does not terminate in the first processing node, send the third item reference to one or more destination processing nodes, wherein each destination processing node has its own processing node identifier; and in response to receiving and sending the third item reference, add an entry to the local reference dictionary, wherein the entry comprises the third item reference identifier, a set of identifiers comprising the first processing node identifier and the processing node identifier for each destination processing node to which the third item reference was sent, and a status indicator that indicates the status of the third item reference as in process.

11. The computer program product of claim 10, wherein the computer readable program when executed on a computer further causes the computer to:

determine if a pre-determined threshold has been satisfied, and if it has, flushing the local reference dictionary by:

determine each entry in the local reference dictionary that comprises a status indicator of complete;

compute a master set of identifiers comprising the union of each set of identifiers from each of the determined entries; and send the local reference dictionary to each processing node having a processing node identifier in the master set.

12. The computer program product of claim 11, wherein the pre-determined threshold is a pre-determined volume of data transfer passing to or from the first processing node.

13. The computer program product of claim 9, wherein the computer program product is stored on a computer useable optical storage medium.

14. The computer program product of claim 9, wherein the computer program product is stored on a hard disk.

15. A system for distributed garbage collection, comprising:

a memory having a reference list stored therein, wherein the reference list comprises a plurality of entries, each entry corresponding to a locally-originated item reference and comprising an identifier for the locally-originated item reference and a local set of destination node identifiers comprising a processing node identifier for each destination processing node to which the locally-originated item reference was sent; and a processor configured with logic to:

receive a remote reference dictionary, wherein the remote reference dictionary comprises a plurality of entries, each entry corresponding to an item reference and comprising an identifier for the item reference and a set of destination node identifiers;

determine if the remote reference dictionary contains an entry for one or more locally-originated item references, and if yes, then for each locally-originated item reference, apply the remote reference dictionary entry to the reference list, by subtracting the set of destination node identifiers in the remote reference dictionary for the locally-originated item reference from the local set of identifiers for the same item reference to yield a first calculated set of one or more destination node identifiers, subtracting the local set of identifiers for the locally-originated item reference from the remote set of identifiers for the same item reference to yield a second calculated set of one or more destination node identifiers, and replacing the local set of identifiers with the union of the first and second calculated sets; and determine if the local set of identifiers comprises any destination node identifiers for one or more locally-originated item references, and if not, marking those item references for garbage collection;

perform garbage collection on the marked item references;

create a locally-originated item reference having an item reference identifier;

send the locally-originated item reference to one or more destination nodes, wherein each destination node has its own node identifier;

in response to creating and sending the first item reference, add an entry to the local reference list, wherein the entry comprises the item reference identifier and a local set of identifiers comprising the node identifier for each destination node to which the locally-originated item reference was sent.

16. The system of claim 15, wherein the memory further comprises a local reference dictionary stored therein, wherein the local reference dictionary comprises a plurality of entries, each entry corresponding to a remotely-originated item reference and comprising an identifier for the remotely-originated item reference, a set of destination node identifiers, and a status indicator that indicates a local processing status for the remotely-originated item reference as either in process or complete; and wherein the processor is further configured with the logic to:

receive a remotely-originated item reference having an item reference identifier;

send the remotely-originated item reference to one or more destination nodes, wherein each destination node has its own node identifier; and in response to receiving and sending the remotely-originated item reference, add an entry to the local reference dictionary, wherein the entry comprises the item reference identifier, a set of identifiers comprising the node identifier for each destination node to which the remotely-originated item reference was sent, and a status indicator that indicates the local processing status of the remotely-originated item reference as in process.

17. The system of claim 16, wherein the processor is further configured with the logic to:

determine if a pre-determined threshold has been satisfied, and if it has, flush the local reference dictionary by:

determine each entry in the local reference dictionary that comprises a local processing status indicator of complete;

compute a master set of identifiers comprising the union of each set of identifiers from each of the determined entries; and send the local reference dictionary to each destination node having a node identifier in the master set.

18. The system of claim 17, wherein the pre-determined threshold is a pre-determined time interval.

19. The system of claim 17, wherein the pre-determined threshold is a pre-determined size of the local reference dictionary.

20. The system of claim 16, wherein the processor is further configured with the logic to:

receive a second remotely-originated item reference having an item reference identifier;

in response to receiving the second remotely-originated item reference, updating the local reference dictionary by changing the status indicator of any existing entries to indicate the local processing status as complete;

send the second remotely-originated item reference to one or more destination nodes, wherein each destination node has its own node identifier; and in response to receiving and sending the second remotely-originated item reference, add an entry to the local reference dictionary, wherein the entry comprises the item reference identifier, a set of identifiers comprising the node identifier for each destination node to which the second remotely-originated item reference was sent, and a status indicator that indicates the local processing status of the second remotely-originated item reference as in process.

21. The system of claim 16, wherein the processor is further configured with the logic to:

receive a second remotely-originated item reference having an item reference identifier;

in response to receiving the second remotely-originated item reference, updating the local reference dictionary by changing the status indicator of any existing entries to indicate the local processing status as complete;

determine that the second remotely-originated item reference terminates locally; and in response to said determination, adding an entry to the local reference dictionary, wherein the entry comprises the item reference identifier, a set of identifiers comprising a local node identifier, and a status indicator that indicates the local processing status of the second remotely-originated item reference as complete.

* * * * *